Jan. 29, 1924.
H. HARDER
1,482,301
FOUR-WHEEL DRIVE
Filed Dec. 16, 1920
2 Sheets-Sheet 1
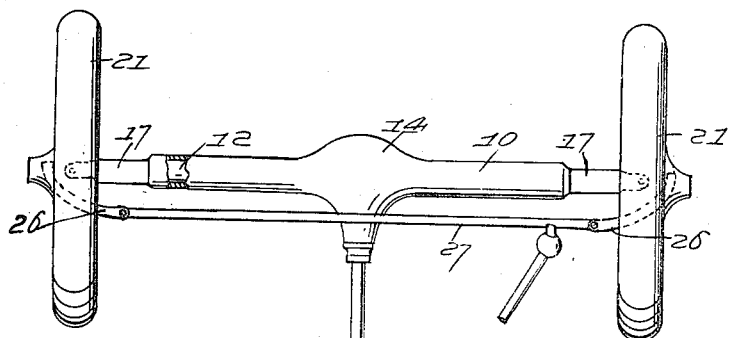
*Fig.1.*
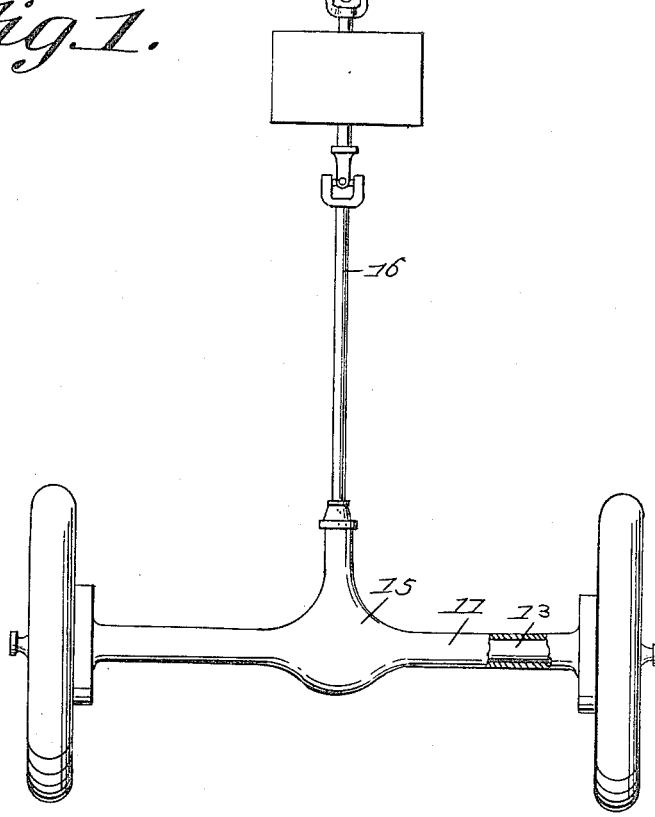
Henry Harder, Inventor Henry Harder, Inventor Patented Jan. 29, 1924.

1,482,301

UNITED STATES PATENT OFFICE.

HENRY HARDER, OF GRANDE PRAIRIE, ALBERTA, CANADA.

FOUR-WHEEL DRIVE.

Application filed December 16, 1920. Serial No. 431,165.

*To all whom it may concern:*

Be it known that HENRY HARDER, a citizen of United States, residing at Grande Prairie, in the Province of Alberta and Dominion of Canada, has invented new and useful Improvements in Four-Wheel Drives, of which the following is a specification.

The object of the invention is to provide means whereby without complication of construction the driving energy of a vehicle motor may be connected to the forward steering wheels and the rear or driving wheels, without modification of the essential features of the steering mechanism by which the position of the forward wheels is controlled to modify direction or progress of the vehicle, and with this object in view, this invention consists in the construction and combination of parts, of which a preferred embodiment is shown in the accompanying drawings, wherein:

Figure 1, is a plan view of the vehicle running gear equipped with a four wheel drive embodying the invention.

Figure 2:
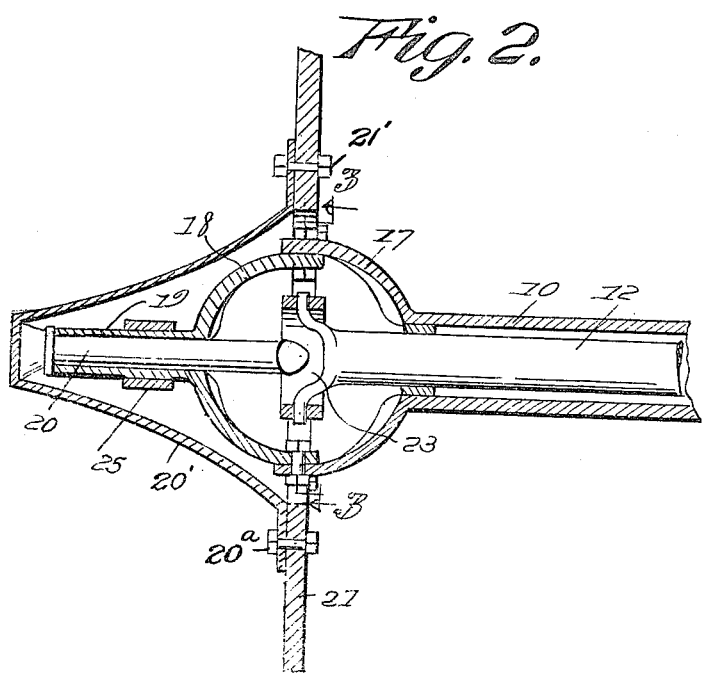
Figure 2, is a detail horizontal sectional view of one of the forward driving wheels and related portions of the auxiliary steering mechanism.
Figure 3:
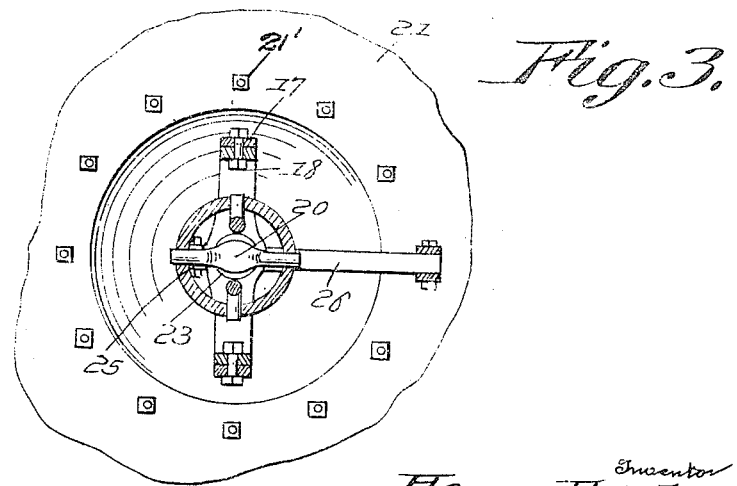
Figure 3, is a vertical sectional view of the construction shown in Figure 2.

In the construction illustrated, the front and rear axles are shown respectively at 10 and 11 and are provided with encased axle shafts 12 and 13, similarly constructed and equipped with intermediate differential gears housed in casings 14 and 15 through which motion is communicated to the front and rear axle shafts from a common drive shaft 16. The front axle is provided at its extremities with yokes 17 which for convenience may be referred to as axle yokes and to which are pivoted spindle yokes 18 having bearings 19 for the reception of the spindles 20 to which are attached the front wheels 21. The spindles 20, at the inner ends are connected with the axle shaft by universal couplings 23 to the end that rotary motion may be communicated from the front axle shaft to the front wheel spindles. The couplings are adapted to yield pivotally in any direction to correspond with the relative positions of the spindle and axle yokes to conform to the deflection of the front wheels from a direct line in the steering of the vehicle.

Connected with the bearings carried by the spindle yokes, as by means of clamps 25 are steering arms 26 which in turn connect transversely of the vehicle in rear of the front axle by the steering bar 27 from which connection may be had with the steering wheel in the ordinary or any preferred manner.

The connections between the spindles 20 and the wheels 21 comprise conical shaped spindle housings 20' with the apexes of which the extremities of the spindles 20 are connected. The base portions of the housings are flanged as indicated at 20ª and are secured to the wheels 21 as by bolts 21'. The steering arms 26 and their connecting clamps are thus enclosed within the housings where they are protected from damage.

The invention having been described, what is claimed as new and useful is:—

A vehicle having a front axle and motor driven axle shaft, axle spindle yokes pivotally connected on vertical axes to the extremities of the front axle and provided with spindle bearings, spindles mounted in said bearings and having universal connections with the extremities of the front axle shaft, steering arms provided with clamps engaged with the bearings of the spindle yokes, wheels, conical shaped housings having their apexes connected with the extremities of the spindles on the interior of the housings, the latter being flanged at the bases and connected to said wheels, a bar connecting the steering arms, and means for imparting longitudinal movement to said bar.

In testimony whereof he affixes his signature.

HENRY HARDER.